United States Patent [19]
Liang

[11] Patent Number: 5,537,099
[45] Date of Patent: Jul. 16, 1996

[54] RECEIVING PORT SECURITY IN A NETWORK CONCENTRATOR

[75] Inventor: Chao-Yu Liang, San Jose, Calif.

[73] Assignee: Bay Networks, Inc., Santa Clara, Calif.

[21] Appl. No.: 245,812

[22] Filed: May 18, 1994

Related U.S. Application Data

[63] Continuation of Ser. No. 870,499, Apr. 16, 1992, abandoned.

[51] Int. Cl.$^6$ .................................................... H04Q 1/00
[52] U.S. Cl. ........................... 340/825.070; 340/825.31; 340/825.34; 370/94.1; 370/13
[58] Field of Search ................... 340/825.07, 825.34, 340/825.31, 825.44; 380/3, 4; 370/13, 94.1

[56] References Cited

U.S. PATENT DOCUMENTS

| | | | |
|---|---|---|---|
| 4,383,257 | 5/1983 | Gallanza | 340/825.44 |
| 4,627,052 | 12/1986 | Hoare et al. | 370/94.1 |
| 4,672,572 | 6/1987 | Alsberg | 364/900 |
| 4,692,918 | 9/1987 | Elliott et al. | 370/94.1 |
| 4,897,074 | 1/1990 | Lidinsky | 340/825.34 |
| 4,901,348 | 2/1990 | Nichols et al. | 380/6 |
| 4,930,159 | 5/1990 | Kravitz | 340/825.31 |
| 4,942,606 | 7/1990 | Kaiser | 340/825.31 |
| 4,974,190 | 11/1990 | Curtis | 364/900 |
| 5,113,442 | 5/1992 | Moir | 340/825.31 |
| 5,173,939 | 12/1992 | Abadi | 340/825.31 |
| 5,274,368 | 12/1993 | Breeden | 340/825.31 |

FOREIGN PATENT DOCUMENTS

| | | |
|---|---|---|
| 10431751 | 6/1991 | European Pat. Off. |
| 59-63839 | 4/1984 | Japan. |

OTHER PUBLICATIONS

Brain P. Schanning, " Secure Relays: An Alternative Approach to LANSEC™, Lecture Notes in Computer Science, Local Area Network Security, Workshop LANSEC'89", European Institute for System Securtiy (E.I.S.S.), Karlsruhe, FRG, Apr. 3–6, 1989 Proceedings, pp. 32–45.

Kwok, C. K. and Mukherjee, B., On Transparent Bridging of CSMA/CD Networks, IEEE, Nov., 1989, pp. 185–190 and, especially paragraph 2 and paragraph 4.3.

Weinstein, J., Bridging to a better LAN, Mini Micro Systems, vol. XXII, No. 2, Feb., 1989, pp. 86–88 and, especially, p. 87, line 12, and p. 88, left–hand column, line 6.

Tanenbaum A. S., Computer Networks, second edition, Prentice–Hall, Inc., 1988, including the table of contents and pp. 128–168.

Meijer, A. and Peters, P., Computer Network Architectures, Computer Science Press, 1983, including the table of contents and pp. 280–283.

Michael S. Katzman, "Smart from the Start: An Introduction to the New AT&T StarLAN 10 SmartHUB and SmartHUB Manager" pp. 22–28, LAN Dispatch/Spring 1991.

*Primary Examiner*—Brian Zimmerman

[57] ABSTRACT

A method and apparatus for preventing intrusive access to a network. The method and apparatus are implemented in a network having a star topology. Utilizing a network management module of a network concentrator as a centralized functional base, unauthorized Data Terminal Elements (DTEs) may be prevented from transmitting messages on a network. By providing a centrally located means by which a set of unique DTE addresses can be associated with a particular port on the network concentrator, valid DTE addresses can be associated with a message packet that contains the address of the transmitting DTE. If the DTE address matches those associated with the port from which it was received, the message packet is authorized. If the DTE address does not match those addresses associated with from which it was received, the message packet is unauthorized. When an unauthorized message packet is received, the port from which the frame was received, is partitioned. The centralized approach utilizing a network manager as a functional base has certain advantages in comparison to distributed security implementations. Such advantages include lower cost and the ease of using existing network management functionality.

5 Claims, 10 Drawing Sheets

RECEIVING PORT SECURITY IN A NETWORK CONCENTRATOR

This is a continuation of application Ser. No. 07/870,499, filed Apr. 16, 1992 now abandoned.

BACKGROUND OF THE INVENTION

1. Field of the Invention

The present invention relates generally to data security systems and more particularly, to a security system and a method for providing receiving port security for a star-configured local area network.

2. Description of the Related Art

Local area networks have been developed for interconnecting various data terminal equipment (DTE) such as computers, work stations and the like. Of course, in such networks it is often important to provide for at least some level of security in transmission of data from one DTE to another DTE.

Description of CSMA/CD

One common type of local area network utilizes a shared communication channel, with access to the common channel being coordinated by the DTE themselves. This form of access control is known as Carrier Sense Multiple Access with Collision Detection (CSMA/CD). CSMA/CD access control is described in a number of publications including, for example, Tanenbaum, A. S., *Computer Networks*, second edition, Prentice-Hall, Inc., 1988 at pages 128–130 and also at Meijer, A., and Peeters, P., *Computer Network Architectures*, Computer Science Press, 1983 at pages 280–283.

In general, CSMA/CD may be described as follows:

A DTE wishing to transmit on the common channel first monitors the channel to determine whether another DTE is using the channel. If the channel is busy, as indicated by the presence of a carrier on the channel, the DTE wishing to transmit will deter transmission. This may be thought of as the carrier sense portion of the protocol. If the channel is not busy, the DTE will transmit a data packet over the channel, with the packet containing an address of the intended recipient. If a DTE detects the channel is busy or if the DTE detects that a collision has occurred on the channel, the DTE will back-off for a period of time and then again sense the channel to determine if the channel is busy.

Assuming physical access to the communication media can be accomplished, an unauthorized DTE could be coupled with the media to transmit messages onto the network. This type of security risk may be referred to as "intrusion". Such an intrusion could result in the extraction of confidential information residing on another DTE in the network or could cause the introduction of a "virus" into the network ( a "virus" is often destructive programming code that secretly attaches itself to a DTE and can destroy the data in the DTE). This presents a serious drawback if security and protection of data in the network is important.

Besides the security risk, intrusion has a second negative effect of transmitting unnecessary and unwanted messages onto the network. This could have an adverse effect on overall network performance.

It is important to state here that in processing and forwarding information in a commercializable network employing the CSMA/CD protocol, it is important that devices follow standards set for such networks. Standards followed by most commercially available CSMA/CD network products are set by the IEEE 802.3 standards. Many well-known commercial networks have implemented a version of the CSMA/CD protocol which has become popularly known as Ethernet.

Primary object of the present invention

It is, thus, a primary object of the present invention to provide for increased security in a networked system.

It is a second object of the present invention to provide for increased security in a networked system in order to prevent or minimize intrusion on the network.

It is a third object of the present invention to filter out undesired network traffic resulting from an intrusion into the network.

Description of typical network equipment

It is noted that the above-description relates to networks in which each DTE has its own interface to the common communications channel, although the present invention is not limited to such a network. This type of a network is further illustrated with reference to FIG. 1. FIG. 1 illustrates a DTE 101 which includes an interface board (not shown) coupled through a transceiver cable 102 to a transceiver 104 which is coupled with a central communications cable 105. Thus, it is readily apparent that an alternate DTE with the appropriate interface board and transceiver cable may be coupled to the central communications cable 105. The above-described components of networks, e.g., central communications cables, transceivers, transceiver cables, interface boards and data terminal equipment are all well-known in the art. A further description of typical components of a CSMA/CD-based network may be found, for example, with reference to *Tanenbaum*, cited above, at pages 141–144.

Concentrator

More recently concentrators (also termed intelligent hubs) have been provided in networks in order to provide for increased connectivity, internetworking, and network management. An example of such a concentrator is the LattisNet System 2000™ intelligent hub available from SynOptics Communications, Inc. of Santa Clara, Calif. In a system utilizing a concentrator, each DTE is coupled to one of a plurality of host modules defined within the concentrator and the concentrator provides a common communication channel, or backplane, allowing for communication between the various DTEs. This type of network, when depicted graphically, can represent a star-like image and, thus, is often referred to as a star configured network.

FIG. 2 illustrates a network as may be configured utilizing a concentrator. As illustrated by FIG. 2, a network may comprise a plurality of concentrators, such as concentrators 201 and 202. Each concentrators may have a plurality of data terminals coupled with the concentrators, such as data terminals 221–223 which are coupled with concentrators 201 and data terminals 231–233 which are coupled with concentrators 202.

The data terminals are coupled with the concentrator through ports defined by one or more host modules which are housed in the concentrator. For example, data terminals 221 and 222 are each coupled with host module 241, respectively, while data terminal 223 is coupled with host module 242.

The host modules are each coupled with a backplane bus (not shown) in the concentrator to allow communication with a repeater module, for example, repeater module 214. The repeater module is responsible for receiving and repeating messages between data terminals coupled with a single concentrator. For example, DTE 221 may transmit a message. Repeater 214 will receive the message after it is transmitted on the backplane of concentrator 201 by host module 241. The repeater will then retransmit the message back onto the backplane so that it may be received by each of data terminals 222 and 223. Data terminals 222 and 223 will then examine the packet to determine if the destination address of the message indicates the message is to be processed.

In addition, the concentrator may comprise a bridge or router module such as module 211 of concentrator 201. The bridge or router module allows communication of messages between the plurality of concentrators which may exist in the network. As can be seen with reference to FIG. 2, concentrator 201 and concentrator 202 are coupled in communication through bridge/router 211 which is coupled with bridge/router module 212 on concentrator 202 to allow messages to be communicated from data terminals 221–223 coupled with concentrator 201 to data terminals 231–233 coupled with concentrator 202.

Some Terminology and discussion of certain objects of the preferred embodiment of the invention Before continuing further, it may be useful to define some basic terminology used in the field of networking. Such terminology is defined in APPENDIX I: DEFINITIONS. From these definitions, it may be useful to understand the definitions of a concentrator, a host module, a bridge, a router, and a repeater.

It will be seen that the preferred embodiment advantageously provides for the incorporation of its security arrangement primarily at the concentrator level. This offers certain advantages over certain alternate embodiments which, while they may incorporate inventive aspects of the preferred embodiment, provide for security aspects at other locations in the network.

For example, it is possible to consider incorporating security arrangements in a host module, a router, in a repeater, or in a bridge. In fact, while the reference is not considered by the Applicant to represent prior art to the present invention, it is worthwhile noting a system described in European Patent Application Publication No. 0 431 751 which was published on Jun. 12, 1991 (the '751 reference). This reference describes a security arrangement in which a multi-port repeater for a local area network has means for storing access rules for items of equipment which may be attached to it. The repeater reads a portion of each frame it receives and compares that information with the stored access rules to determine if the frame is permitted or not. If the frame is not permitted, it corrupts the frame before retransmission. The system is also described as being capable of reporting the source address, destination address and reason for deciding to corrupt the frame to a network controller.

However, one drawback to such an embodiment is that the circuitry for storing the necessary access rules and other circuitry for implementing the security protocols may grow at least linearly with the expansion of the number of ports of the multi-port repeater. In addition, there is likely to be physical limitations imposed on the number of ports supportable by any single multi-port repeater. This may lead to to security complications in an embodiment such as described in the '751 reference.

By incorporating the security technology primarily at the concentrator level, the preferred embodiment of the present invention accomplishes one object of the invention in that it allows for incorporation of the security technology to any number of ports supportable by the network.

Other exemplary security arrangements

Of course, a number of other options may be available to provide varying levels of security in a networked system. For example, data encryption and decryption techniques may be employed in which the data is encrypted by a transmitting DTE and the data may then be decrypted by an intended receiving DTE which has the necessary decryption algorithm. Physical security is also possible, such as by locking up or otherwise preventing access to the data terminal equipment and the common network medium. However, each of these alternatives offers various tradeoffs in expense of implementation, complexity, convenience and standards conformance.

Therefore, it is a object of the present invention to provide improved data security in a data network at minimal cost and complexity.

There are several other well-known techniques for providing data security in local area networks. One such technique is described with reference to U.S. Pat. No. 2,901,348 *Nichols, et al.* which describes a security arrangement which attempts to maintain secure data transmissions between a plurality of data transmitting and receiving devices each of which share common transmission and reception facilities. The security arrangement described in the '348 patent provides security against "eavesdropping" that may result from the sharing of common communication transmission and reception facilities. However, as is understood, the device described by the '348 patent requires, at least in certain cases, buffering of message information such that a delay of greater than the length of the address portion of a packet is introduced into transmission of the such data packets. Introduction of such a delay is not acceptable in commercial networks following at least certain accepted standards. In addition, it is worth mentioning that the '348 patent describes a bus configured system, not a star-configured system as described by the present invention.

Thus, it is an object of the present invention to provide improved security in a network by providing source address (SA) filtering of messages such that ports receiving messages sent by unauthorized users are partitioned so that the unauthorized user's access is terminated. This allows protection against "intrusion".

These and other objects of the present invention will be better understood with reference to the below Detailed Description and the accompanying figures.

SUMMARY

A method and apparatus for preventing intrusive entry into a network is described. Utilizing a network management module as a centralized functional base, unauthorized Data Terminal Elements (DTEs) connected to the network through a network concentrator, may be prevented from transmitting messages on a network. A means by which a set of unique DTE addresses, i.e. a port mask, can be associated with a particular port on the network concentrator is provided. Authorized message packets are identified as those having a DTE address matching the mask. If the DTE address in the message packet does not match the mask, the message packet is unauthorized. When an unauthorized frame is received, the port from which the frame was received, is partitioned.

The method of the preferred embodiment is comprised generally of the steps of: receiving a message packet on a port, transmitting the port identifier to a centralized source address filtering means and simultaneously transmitting the message packet to the centralized source address filtering means, retrieving a port mask associated with the port identifier, extracting the source address from the message packet, comparing the source address with the port mask, if a match occurs, transmitting the message packet back onto the network, if a match does not occur, partitioning the port from which the unauthorized frame was received.

BRIEF DESCRIPTION OF THE DRAWINGS

FIG. 1 illustrates a prior art interface of a Data Terminal Element (DTE) to a first communication cable through a transceiver or the like.

FIG. 5b is an example of an attempted intrusion into the port illustrated in FIG. 5a.

DETAILED DESCRIPTION OF THE PREFERRED EMBODIMENT

What is described herein is a security system, as well as a method of operating such a system, for providing security in a star-configured local area network. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Certain aspects of the preferred embodiment are described in co-pending application Ser. No. 07/827,053, entitled "Method and Apparatus for Providing and Receiving Filtered Messages with Minimal Delay in a Local Area Network or the Like", assigned to the assignee of the present invention. The co-pending application describes a method and apparatus which provides for destination address (DA) and source address (SA) security filtering as may be implemented on a host module.

OVERVIEW OF THE CONCENTRATOR OF THE PREFERRED EMBODIMENT

Figure 1:
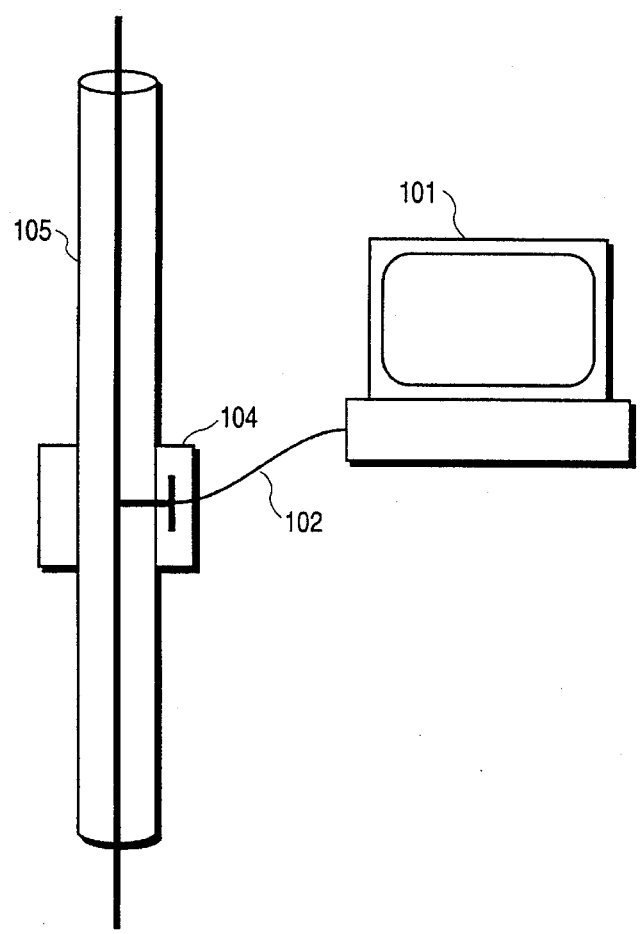
Figure 2:
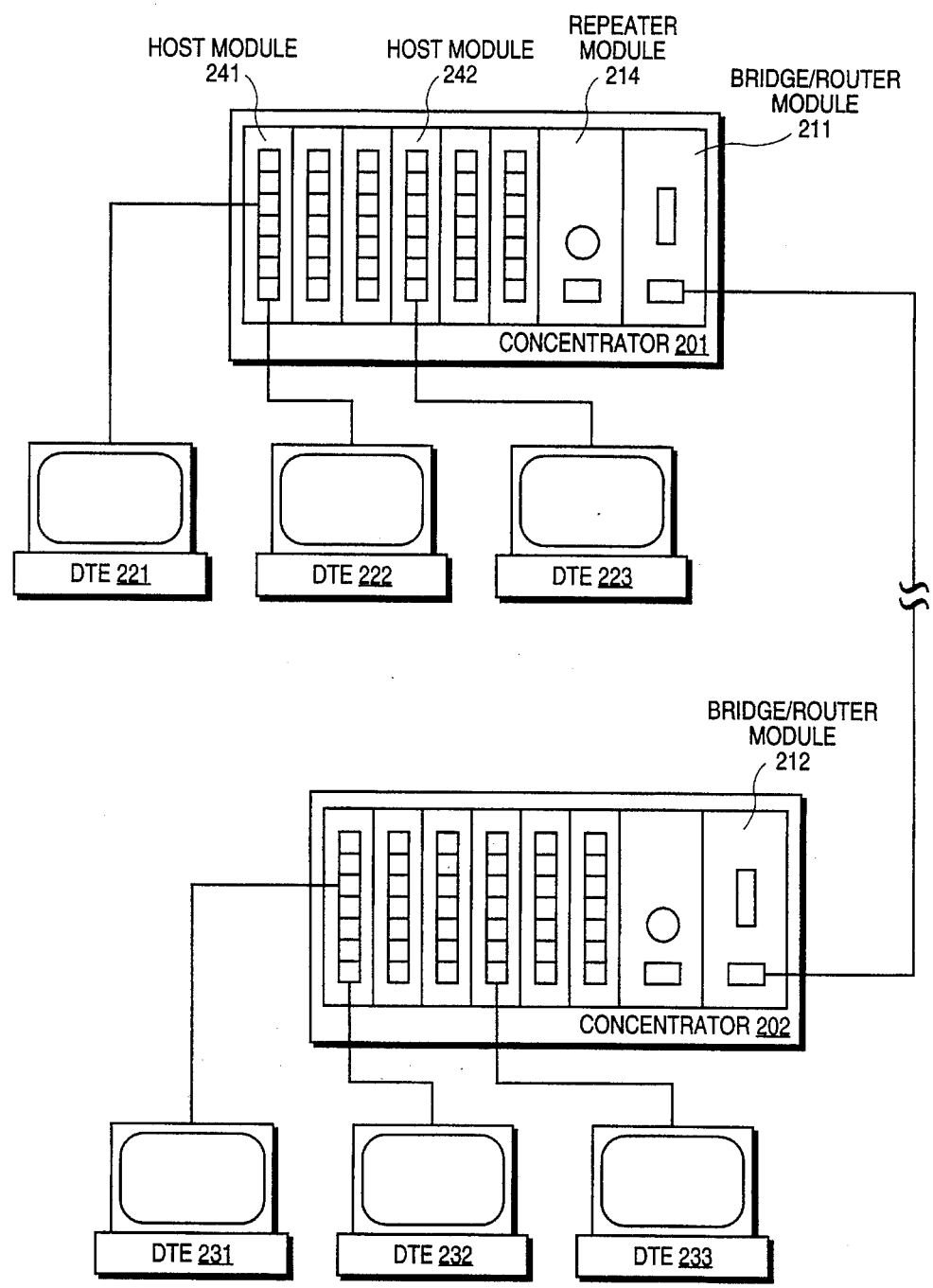
FIG. 2 further illustrates a network including DTEs and network concentrators in which the present invention may be utilized.
Figure 3:
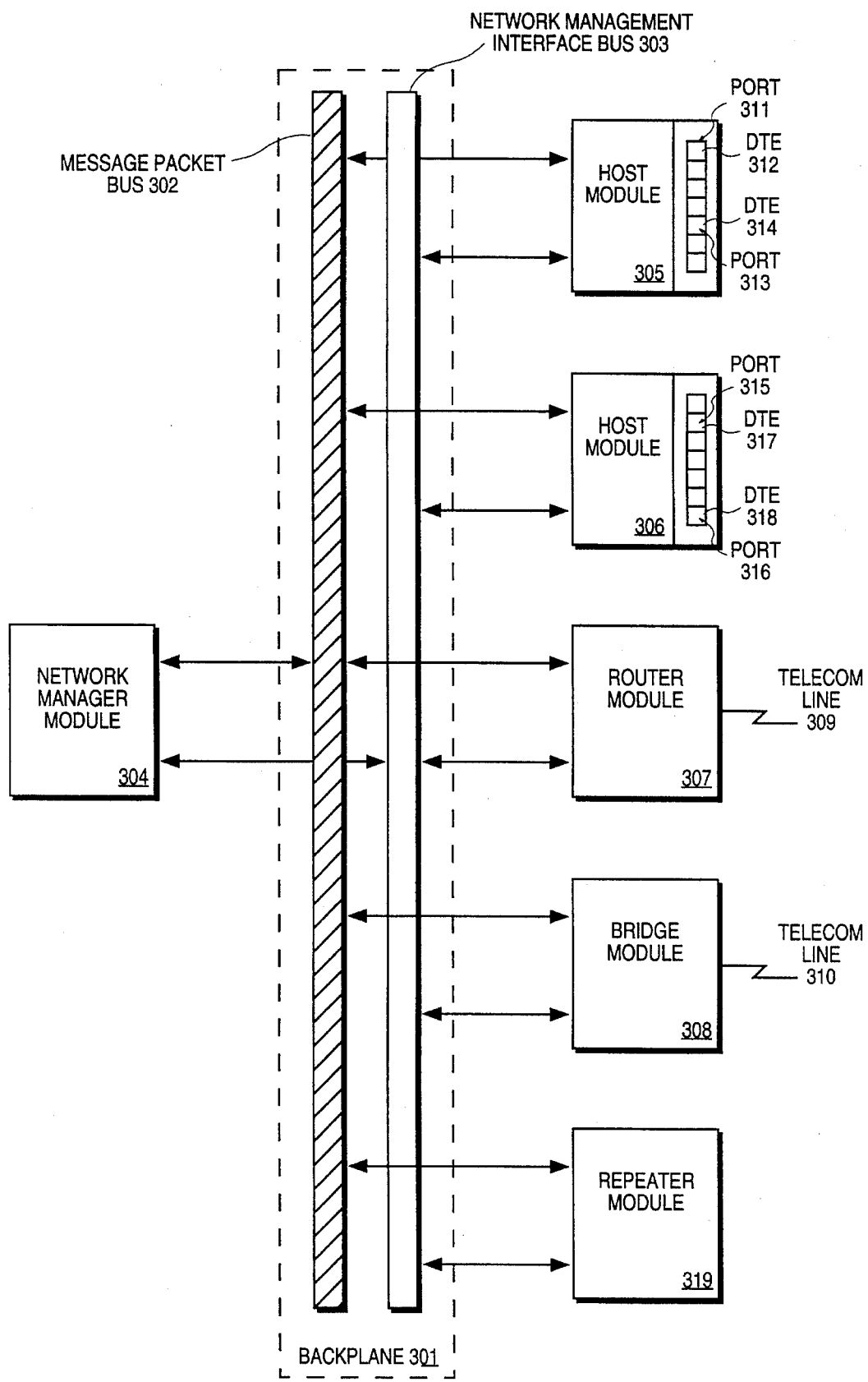
FIG. 3 is a functional block diagram of a network concentrator as may be utilized by the preferred embodiment of the present invention.

FIG. 3 is a functional block diagram of a concentrator in the preferred embodiment. Data terminals are coupled to ports defined by a host module. Here DTEs 312 and 314 are coupled to ports 311 and 313 respectively of host module 305. Similarly, DTEs 317 and 318 are coupled to ports 315 and 316, respectively of host module 306. Also incorporated within the concentrator is a network manager module 304, a router module 307, a bridge module 308 and a repeater module 319. The network manager 304, router 307 and bridge 308 are typically optional modules whose use depends on the network configuration. The repeater module 319 is required and is used to receive, reclock, rebuild packets, amplify and retransmit electrical signals comprising the message packets being transmitted within the concentrator. Note that it is a message packet being transmitted within the concentrator. The message packet will typically contain a communicator frame originating from a DTE. The network management module 304 may be used to gather network traffic statistics, and perform other network management functions. The router 307 and bridge 308 are coupled to telecommunication lines 309 and 310, respectively, and are used for coupling to other portions of the network.

The various modules within the concentrator are coupled together via a backplane 301. Generally, the backplane bus 301 is comprised of a message packet bus 302 and a network management interface bus (NMI) 303. It is through the message packet bus 302 that messages are transmitted between the various modules in the concentrator. It is important to note that the network management module 304 is also coupled to the message packet bus 302. The network management interface bus 303 is used for network management communication between host modules 305 and 306, router 307, bridge 308 and the network management module 304.

The host modules typically are designed to support a single type of communication media and method—for example, Ethernet, Ethernet fiber optic, 50-pin 10BASE-T, Ethernet 10BASE-T, Token ring shielded twisted pair, or Token ring unshielded twisted pair. Although various host modules may be intermixed within a single concentrator, the preferred embodiment is described in reference to an Ethernet concentrator, wherein only Ethernet host modules are coupled.

In the present invention, each data terminal which is coupled with the network is identifiable with a unique device identifier. (In the preferred embodiment, the Medium Access (MAC) address of the device is used as the unique device identifier. However, it will be obvious to one of skill in the art that any other identifier which would uniquely identify a device may be utilized without departure from the spirit and scope of the present invention.) Further, when a DTE is coupled with a port of a host module, the port stores the unique device identifier of the DTE. These identifiers will be discussed in greater detail below.

In general, each host module receives message packets from the various data terminals coupled with it and formats the message packets for transmission on the backplane bus. Once a message packet is placed on the backplane, it passes through the network management module. The network management module gathers performance and activity information for the network. Once the requisite information is derived from a message packet, it is placed back onto the backplane wherein a repeater or router, or both receive the message packets and retransmit the packets either back onto the backplane bus in the case of the repeater or onto a communications channel for receipt by another concentrator in the case of a router. Each host module will then receive the retransmitted packet and will transmit the packet to the various DTEs coupled with it. The general functions of the host modules, repeaters and routers, and in fact of the concentrators, are well-known in the art. Therefore, further description is not necessary here.

It is important in a network as may be supported by the present invention that some controls be established over data terminals which are given access to the network. Certain types of data terminals may be incompatible with the network and, therefore, should not be allowed to connect with the network or transmit messages onto it. Unauthorized access to the network may also occur because it is often difficult, if not impossible, to prevent unauthorized physical access to the cabling for the network. Of course, with the introduction of communication over non-physical media such as radio waves, microwave, etc., this problem becomes even more difficult to solve through implementation of physical security measures. Therefore, it can be expected that unauthorized messages may be transmitted onto the network if some controls are not established.

Control over transmission of messages onto the network of the present invention is accomplished by a method and apparatus which implement what will be referred to as source address (SA) filtering. In the preferred embodiment, SA filtering is performed at the concentrator level, namely within a network management module. The reasons for and advantages of such an implementation will become more apparent in the following description.

Description of a Message Packet

Figure 4:
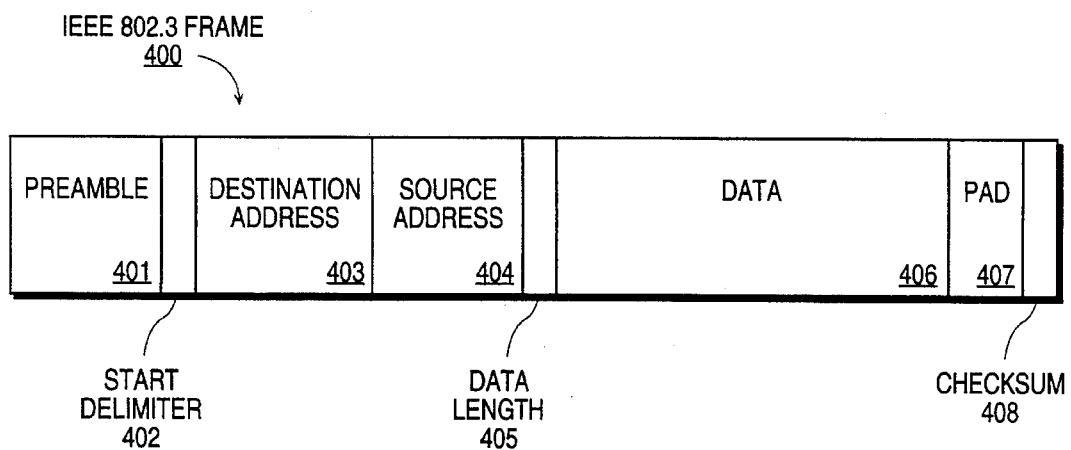
FIG. 4 illustrates a message packet, namely an IEEE 802.3 message packet.

At this point, it is instructive to describe a message packet as transmitted by DTE device in the preferred embodiment. Generally, a message packet, also known as a frame, is a sequence of bits which are ordered in a predetermined fashion to create fields of information. Such message packet layouts have been standardized by the institute of Electrical and Electronics Engineers (IEEE), for example the IEEE 802.3 standard which is illustrated in FIG. 4. As the IEEE 802.3 standard refers to the format as a frame, that terminology will be used in this description. FIG. 4 illustrates a message frame 400 conforming to the IEEE 802.3 standard frame format. A first section of the message frame contains a 7 byte preamble 401. The 7 bytes in the preamble 401 each contain a bit pattern of 10101010. The Manchester encoding of such a pattern produces a 10 MHz square wave for 5.6 microseconds to allow the receivers clock to synchronize with the senders. Following the preamble, is a 1 byte start delimiter 402. The start delimiter byte 402 will have a bit pattern of 10101011 to denote the start of the frame information. Following the start delimiter 402 is the destination address 403 of the DTE for which the communication is destined. Following the destination address 403 is the source address 404 of the DTE from which the message frame originated. It should be noted that the IEEE 802.3 standard provides for each of the destination address 403 and the source address 404 to be either 2 or 6 bytes in length.

Following the source address 404 is a data length field 405 of 2 bytes. Following the length field 405 is the data portion 406. Following the data portion is an optional pad field 407. The pad field is necessary in order to create valid frames. A valid frame must be at least 64 bytes long, from destination address to a checksum field 408. In the event that the data field 406 is less than 46 bytes, the pad field 407 is used to fill out the frame its minimum length. Finally, the checksum field 408 is used for the correction of erroneously received data.

It should be noted that the present invention is not limited for use with networks following the 802.3 standard. It should be apparent to one skilled in the art that the present invention may be embodied on networks with a star topology that embody a source address with a message packet.

OVERVIEW OF THE OPERATIONS OF THE PREFERRED EMBODIMENT

It is useful to provide an overview of the operations of the system of the preferred embodiment before beginning a more detailed discussion of the circuitry used to implement the system of the preferred embodiment. As has been discussed, the preferred embodiment of the present invention implements source address (SA) filtering wherein messages received by a particular port on a host module are retransmitted only after discriminating out messages which have been received from a DTE not having an authorized source address.

An illustration of SA filtering

Figure 5A:
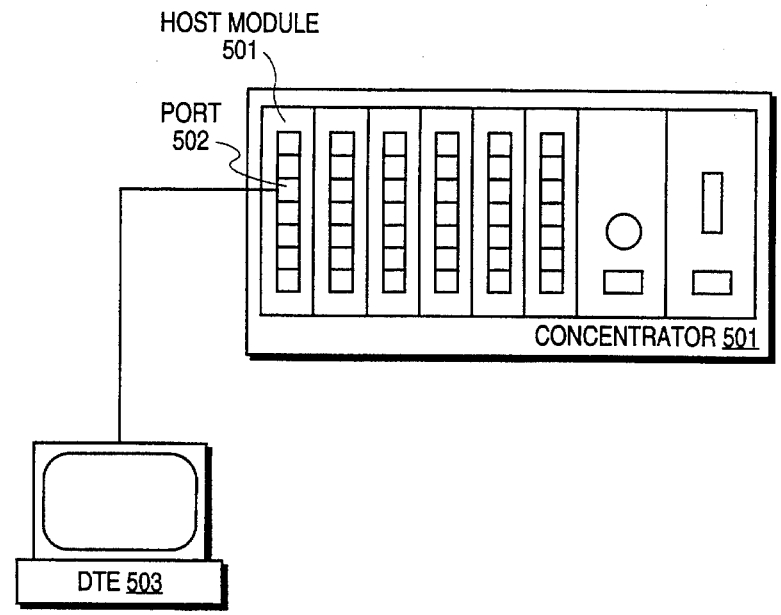
FIG. 5a illustrates the relationship between a host module, port, and a DTE as found in a network concentrator.
Figure 5B:
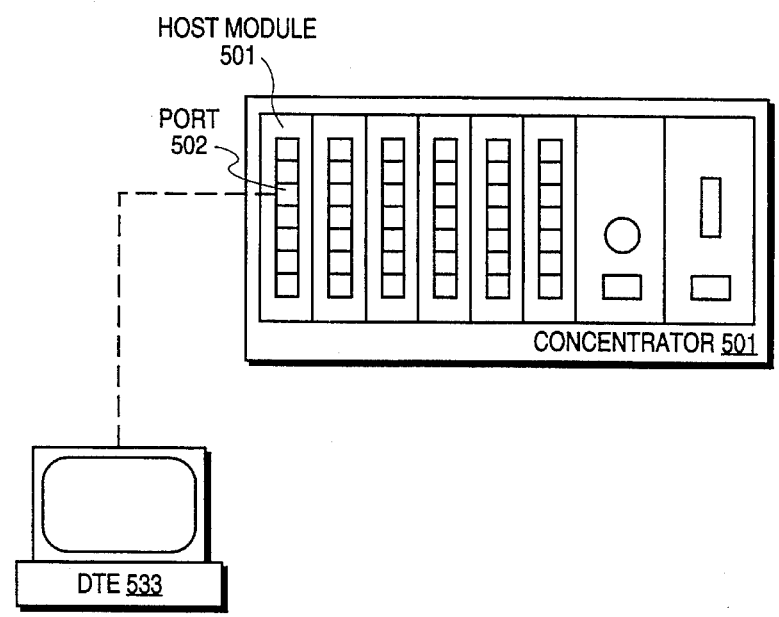
Figure 6:
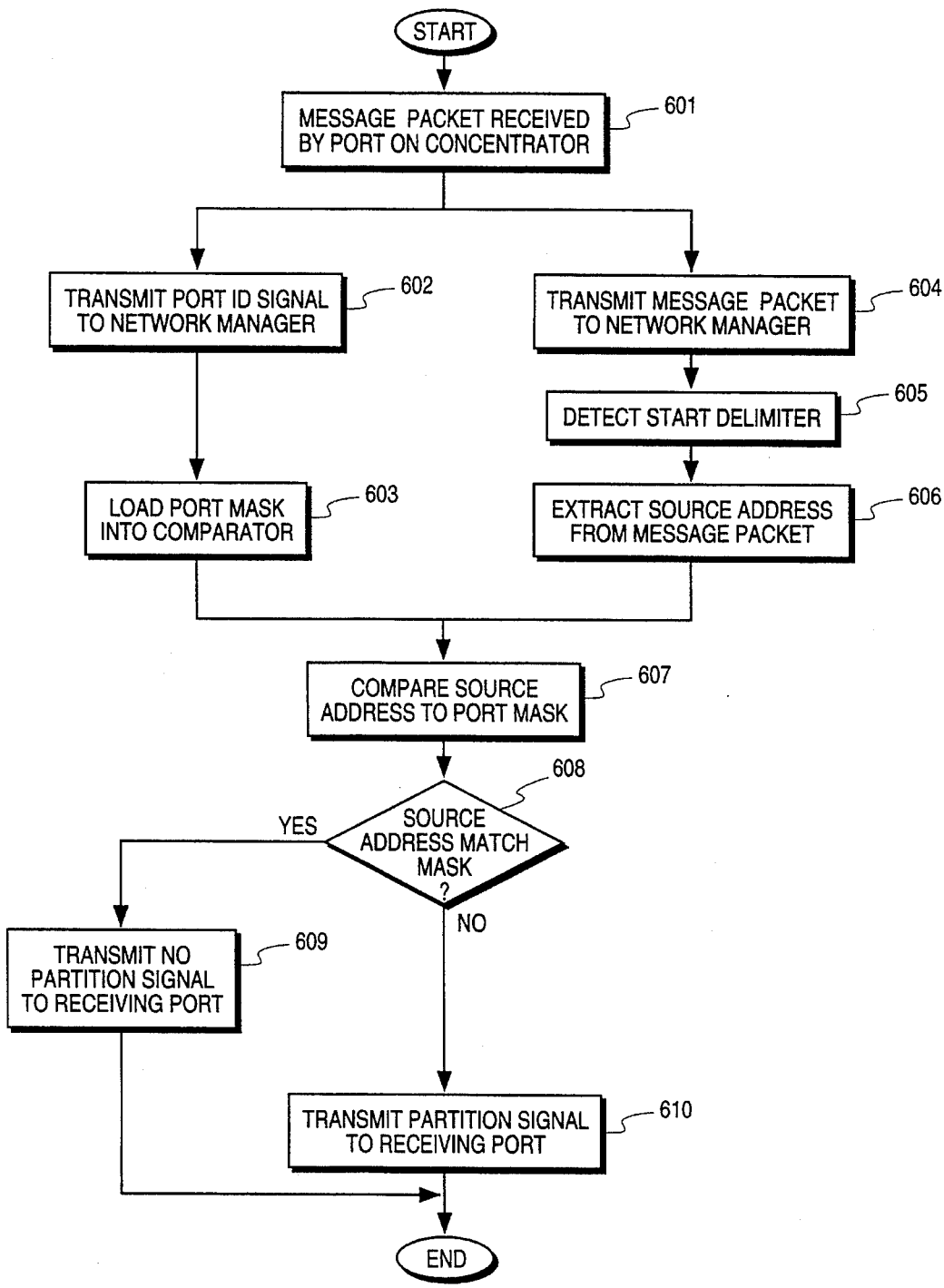
FIG. 6 is a flowchart of the source address filtering method as utilized by the preferred embodiment of the present invention.

FIGS. 5a and 5b and its accompanying flow diagram shown in FIG. 6 together illustrate the concept of source address filtering. As was described above, each DTE attached to a port has a unique device identifier (i.e. a source address) and each port to which a DTE is attached stores a unique port device identifier. As one aspect of the present invention the Source Address filter includes means for associating a set of DTE identifiers to a unique port address. Referring to FIG. 5a for example, a host module 501 is provided with means for associating a particular port with a given set of DTEs. Assume that only the DTE 503 is associated with the port 502. However, as illustrated by FIG. 5b, DTE 503 has been replaced by DTE 533. This is an example of an attempted intrusion.

FIG. 6 illustrates the source address filtering of the preferred embodiment. First a message packet is received by a port on the concentrator,step 601. The steps 602–603 and steps 604–606 are then performed simultaneously. When the message packet is received a port ID signal is generated and transmitted to the network management module via the NMI bus, which indicates the receiving port for the message packet, step 602. The port ID signal is then used to retrieve a port mask from a port mask storage means and stored in a comparator, step 603. Simultaneously, the message packet is transmitted by the host module onto the concentrator backplane on the message packet bus where it is received and subsequently retransmitted by the network manager, step 604. A start delimiter is detected from the packet, step 605 whereupon a source address is extracted and stored in the comparator, step 606.

The source address is then compared to one or more addresses contained in the port mask, step 607. It is then determined if the there is a match, step 608. If a match exists, a no partition signal is generated, step 609. If no match exists, a partition signal is generated, step 610. Note that the generated partition signal would cause at least the partitioning of the port that received the unauthorized message packet, but may also be used to cause the partition of any combination of ports.

Creation of Port Masks

A prior action required before the method described in FIG. 6 may be utilized is the creation of Port Masks. Ports masks are centrally stored in a port mask storage means. Thus, the masks for the individual ports must be loaded into the port mask storage means. Such a port mask storage means may typically be a table look-up structure where the port-identifier is the key for retrieving the port mask. Means for creating a port mask storage means are well known in the art.

A port mask may be manually loaded into the port mask storage means by a network manager. Alternatively, the port masks may be created dynamically via an auto-learn mode. In such an auto-learn mode the valid DTE identifiers for a port are learned during initial network operation. Such an auto-learn mode is described in copending application Ser. No. 07/827,053, entitled "Method and Apparatus For Providing and Receiving Filtered Messages With Minimal Delay in a Local Area Network or the Like", filed Jan. 28, 1992 and which is assigned to the assignee of the present invention.

CIRCUIT IMPLEMENTATION OF THE PREFERRED EMBODIMENT

The source address filtering mechanism of the preferred embodiment is generally comprised of two components; a detection component and a partition action component. Here, the detection component is performed by the network management module on the backplane, while the partition action is by a host module on a particular port.

It is advantageous to utilize the network management module as the detection portion for SA filtering for numerous reasons. First, all message packets pass through the network management module, thus, a minimal disruption to the flow of message packets is incurred. Second, a central location for valid sources addresses/ports can be maintained. Thus, allows a network manager to be able to dynamically change port masks without disrupting the network. Third, as a user interface may currently be maintained for network management functions, a user interface for the security mechanisms would be easily extensible. Fourth, the implementation of security mechanisms within network management has certain cost advantages. For example, if security was implemented at the host module level, the costs would be increased on a per host module basis. Finally, as described above, a network management system will include a command for partitioning one or more host ports.

However, implementation of SA filtering at the network management level has one known potential drawback that is addressed by an embodiment of the present invention. The time required to perform the detection and subsequent partition action may permit the transmission of one or more unauthorized message packets. One approach to preventing all unauthorized message packets would be to buffer all incoming message packets pending the above described filtering. However, it would be apparent that such buffering could cause abnormally long delays that may be outside prescribed standards.

A first implementation of the present invention permits the transmission of or more unauthorized message packets, while a second implementation only allows a partial frame to be transmitted. The first implementation is referred to as the software embodiment, whereas the second implementation is referred to as the hardware embodiment.

Figure 7A:
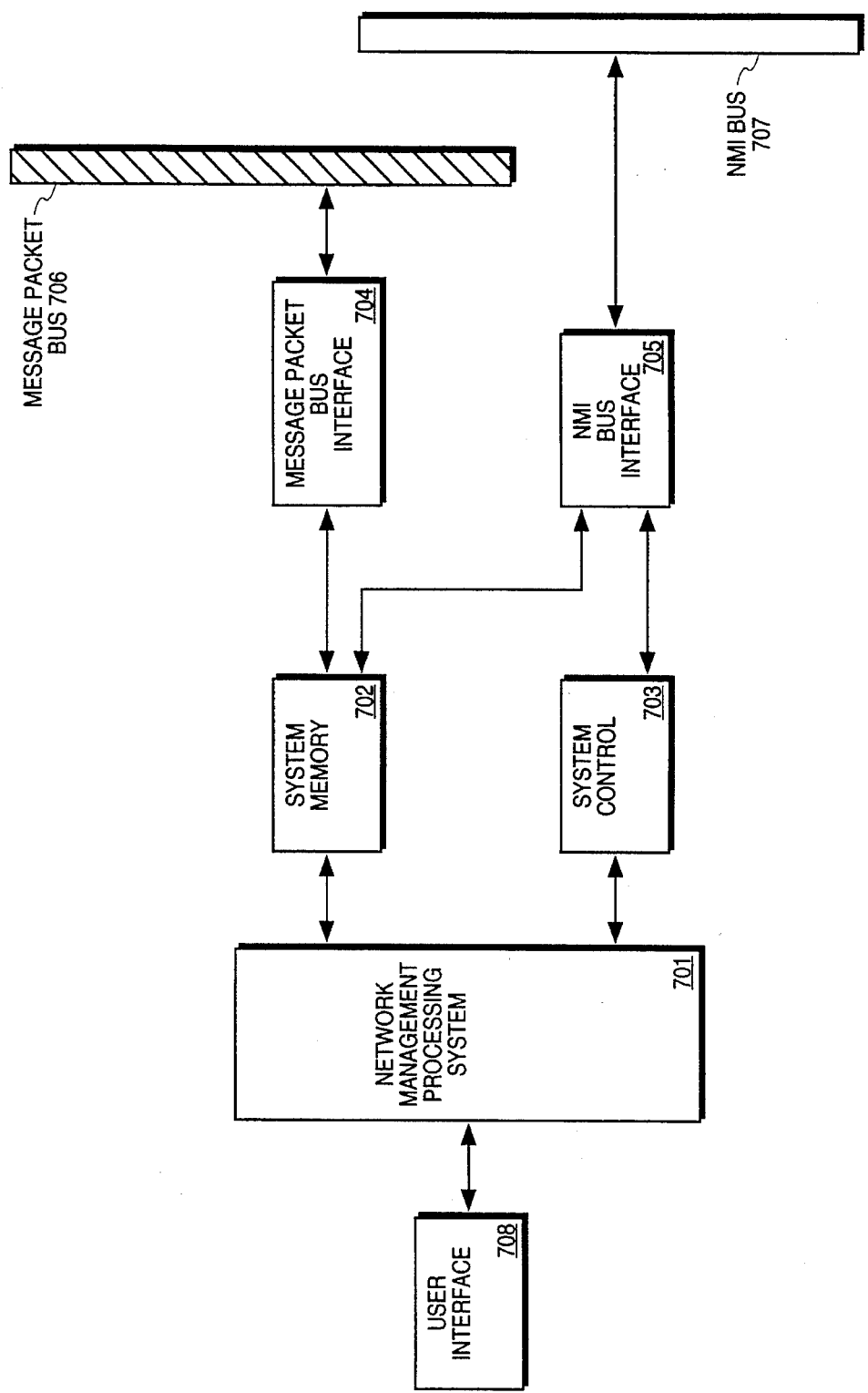
FIG. 7a is a block diagram of a prior art network management module.

In the software embodiment, the method as described with reference to FIG. 6, i.e. the detection portion, is performed exclusively in the network manager module. FIG. 7a is a block diagram of a network management module in more detail. The heart of the network management module is embodied in the Network Management Processor (NMP) 701. The NMP 701 is a general purpose processor such as the V35 or 80186, available from the Intel Corporation of Santa Clara, Calif. The NMP 701 is coupled to system memory 702. The system memory is typically comprised of a collection of Dynamic Random Access (DRAM), Read Only Memory (ROM) and Static Random Access Memory (SRAM) components. The DRAM/ROM components are used by the NMP 701 in the same fashion as would a microprocessor in a general purpose computer system. The SRAM component is used in connection with operation of the message bus.

Further illustrated is system control 703. The system control 703 represents various functions required for system operation, e.g. bus arbitration, interrupt handling, etc.. The message bus interface 704 provides an interface to the message bus. The NMI Bus interface 705 provides an interface to NMI Bus 707. It is over the NMI Bus interface 705 that network management commands are provided to a host module.

It is now instructive to review the processing that occurs during the receipt of a message packet. When a message packet is received by a host module, the physical ID address corresponding to the receiving port is transmitted to the network management module over the NMI bus. Concurrently, the message packet is transmitted over the message packet bus where it is received and stored in the Network management module prior to it being transmitted back out onto the message packet bus and into the network.

Figure 8:
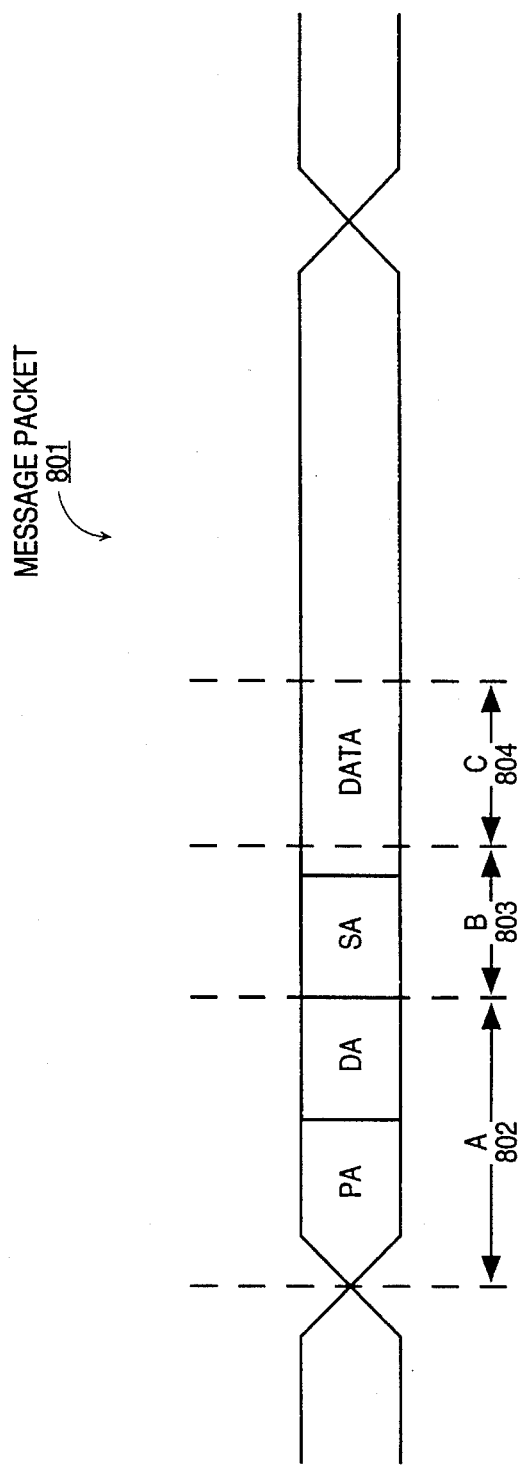
FIG. 8 is a timing diagram of the functions performed in the hardware embodiment of the present invention.

In the software embodiment, the method of FIG. 5 is embodied entirely within the network management processor 701, system memory 702 and system control 703. In the hardware approach, additional circuitry is added to the network management module. To appreciate the critical timing aspects of the hardware approach, a timing diagram is illustrated in FIG. 8. Here a message packet 801 has been transmitted. In time period A 802, i.e. the time from the beginning of the preamble to the end of the destination address (DA) field, the port identifier is generated and the corresponding port masking is loaded into the comparator. At time period B 803, the source address is loaded into the comparator and the comparison is made. Finally, in time period C 804, the partition or no partition signal is generated. In addition to the partition signal, the transmission of the remaining of the message packet may be terminated by the Network Management Module.

Figure 7B:
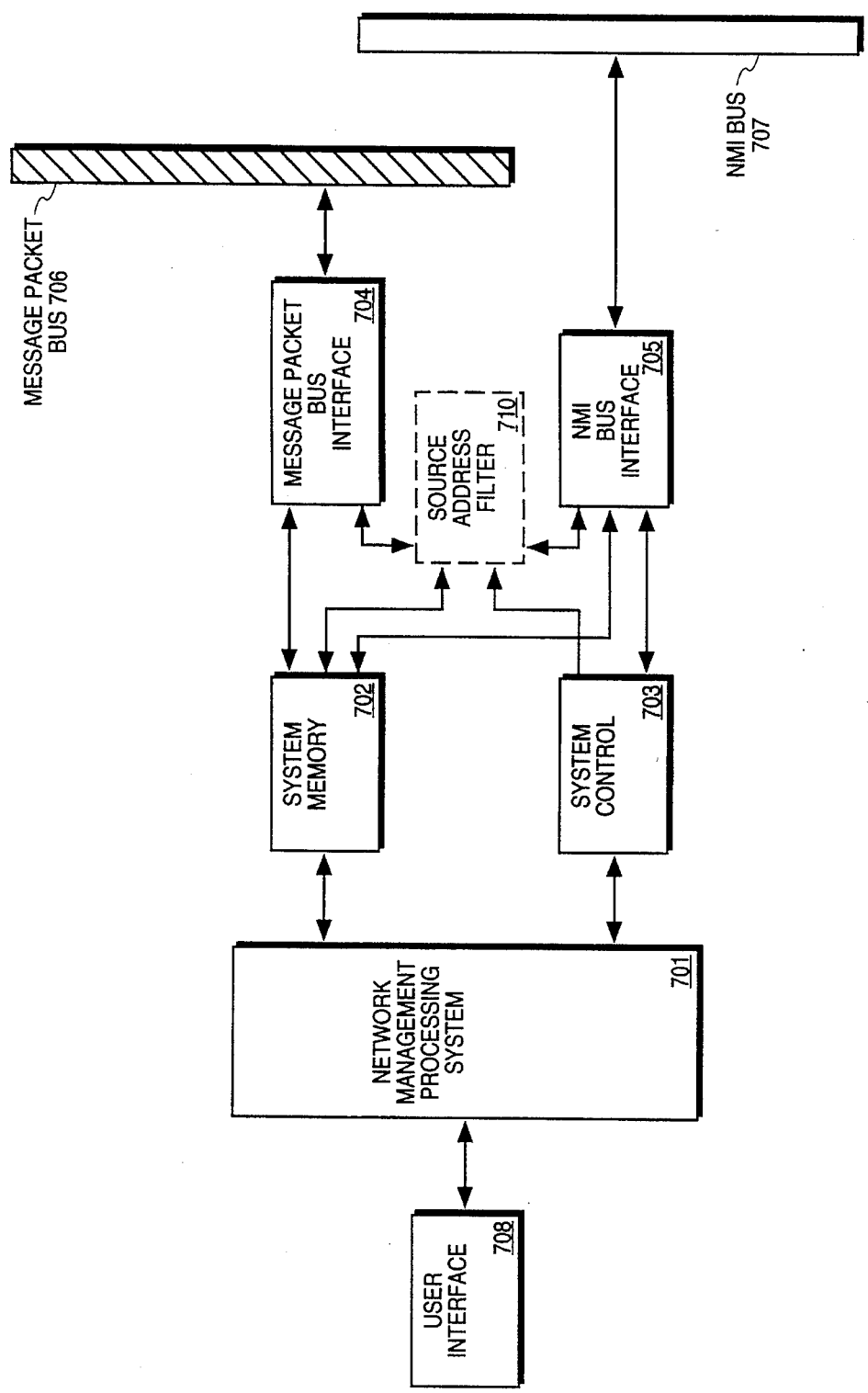
FIG. 7b is a block diagram showing insertion of a hardware embodiment of the present invention into a network management module.

FIG. 7b illustrates the placement of a source address filter in the hardware embodiment. Here, source address filter 710 is coupled between the message bus interface 704, the NMI bus interface 705 and system memory 702.

Figure 9:
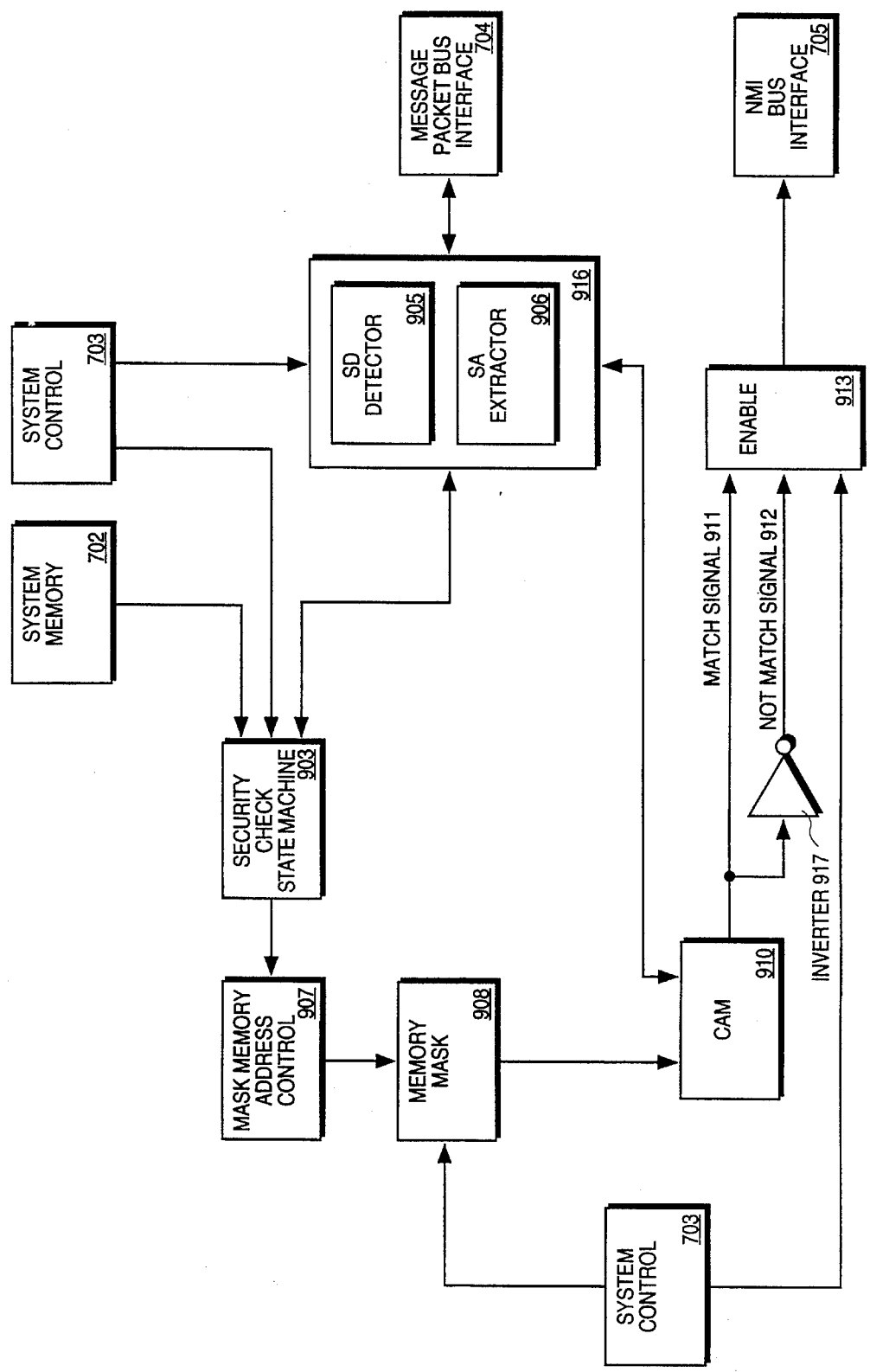
FIG. 9 is a block diagram of the hardware embodiment of the receiving port security apparatus as may be used in the preferred embodiment of the present invention.

FIG. 9 illustrates in a block diagram format, a source address filter such as that illustrated in FIG. 7b. A security check state machine 903 detects for receipt of a frame via the state of certain control signals from system control 703. In the preferred embodiment, the control signal Carrier Sense (CRS) is asserted without control signals Transmit Enable (TXE) and Collision (COL) being asserted. A port ID is obtained from the system memory 702 by the security check state machine 903 where it is latched. Based on this port ID, the security check state machine 903 causes mask memory address control 907 to load into a Content Addressable Memory (CAM) 910, a corresponding mask from mask memory 908. Meanwhile, a message packet enters a packet processor 916. The packet processor 916 contains a start delimiter detector 905 and a source address extractor 906. The start delimiter detector 905 provides a synchronizing means whereby the source address extractor 906 can determine the proper source address. Once the source address is extracted, it is provided to the CAM 910 for comparison. The CAM circuit 910 generates a match signal 911 if the source address is found in the current mask. The match will then be latched into an enable circuit 913. A not match signal 912 is derived from match signal 911 through inverter 917. The enable circuit compares the match result with match requirements received from system control 703 to generate a frame partition pulse 915. The match requirements is simply a means for controlling the use of source address filter. For example, instances may arise where it is desirable not to use the source address filter, e.g. when doing network testing. In any event, the frame partition pulse 915 will be transmitted to the NMI bus interface 705 and on the appropriate host module from which the message frame originated. Note that the frame partition pulse is a signal to the host module as to whether or not to partition the receiving port.

It should be noted that a significant time is typically required to make the mask comparisons. It is through the use of a high speed comparator, e.g. an AMD99C10 CAM chip available from Advanced Micro Devices of Sunnyvale Calif., that comparisons can be made to minimize the time required to make any mask comparisons.

In an alternative embodiment, instead of partitioning the message frame when the FP pulse is generated, the host module can replace the message frame with the Ethernet preamble until the end of the receiving frame. However, such an alternative embodiment will not gain the bandwidth back from the unauthorized transmitting of messages.

Thus, a method and apparatus for receiving port security for use in a network concentrator has been described.

APPENDIX I

DEFINITIONS
The follow terms, and definitions for those terms, are used in the specification of the present invention:

| | |
|---|---|
| Bridge - | Bridges offer the simplest and most common method for connecting LAN segments. Bridges listen to all network traffic on their connected networks and, by examining each data packet's destination address, decide whether to forward the data packet to the rest of the network. Bridges are generally protocol independent from the network layer up. Bridges may generally be divided into two categories-local and remote. Local bridges connect networks in a single location such as a building or a campus. Remote bridges are used to join distant networks over serial lines when it is not practical to provide for a direct connection. Bridges generally receive an entire frame of data, store it, analyze it, and then retransmit it as required by their rules. Therefore, bridges generally introduce a delay in message transmission of longer than the frame length. This must be considered in network design in order to insure compliance with the various standards which exist for communications within a single local area network. Bridges are useful for communications between two different network segments. |
| Concentrator - | Also termed an intelligent hub or a hub. A center point in a star-configured local area network where individual communication lines for each DTE come together and network traffic can be managed and routed. A concentrator typically comprises at least one host module, a repeater and possibly a router or bridge for coupling the concentrator with other local area networks. The concentrator further comprises a backplane which allows for communication of messages and information between the various host modules, routers and/or bridges in the concentrator. |
| DTE - | Also termed data terminals or data terminal equipment. An individual device on a local area network such as personal computer, a workstation, a mainframe computer, a dumb or intelligent terminal, or the like. Typically, in a star-configured network, a DTE is coupled with the network through a transceiver and cable to a host concentrator. |
| Host Module - | A module which may be placed in a concentrator which allows connecting one or more data terminals with a concentrator. |
| Hub - | See definition of concentrator. |
| Intelligent Hub - | See definition of concentrator. |

APPENDIX I-continued

DEFINITIONS
The follow terms, and definitions for those terms, are used in the specification of the present invention:

| | |
|---|---|
| Hub - Interface board - | A printed circuit board which may be installed in a DTE which comprises a controller chip for formatting, transmitting, receiving and unformatting data frames. The interface board is typically coupled with a transceiver through a transceiver cable or, alternatively, the transceiver is built in as part of the interface board. |
| Multi-port Repeater - | A repeater which can be coupled with more than two ports. See definition of repeater. |
| Repeater - | Networks are often split into two or more physical communications segments because of limitations on maximum cable length and other problems with attenuation of the signal. This leads to the need for repeaters which are used to restore signals received on port and repeat those restored signals on another port. Repeaters, unlike bridges, generally indiscriminately forward packets. Generally, repeaters begin to retransmit the data before the complete frame has been received. Thus, repeaters, unlike bridges, generally introduce delays in communication which conform to the IEEE 802.3 specifications. As a result of introducing minimal delay, repeaters are useful to provide for signal attenuation within a single local area network segment while providing for compliance with the various standards which have been established for such networks. |
| Router - | Routers offer the capability for connecting individual networks. Router are similar to bridges in that they keep local messages from reaching the rest of the network. However, unlike bridges, which simply forward data not addressed to a station on their network segment, router actually direct data packets to their final destination over the least costly available path. Like bridges, routers can be both local and remote. |
| Transceiver - | A device for connecting coupling a DTE with a communications media and for performing necessary conversion of the signal, for example, from an digital signal to an analog signal. |

I claim:

1. A network concentrator comprising:

a) a module having a first port and a second port, said first port coupled to receive a first message packet, and said first message packet having a first source address;

b) an internal bus coupled to said module to permit communications with said first port and second port;

c) a security circuit coupled to said internal bus, said security circuit for checking said first source address of said first packet, said security circuit for accessing a first address mask from a plurality of address masks, each address mask of said plurality of address masks corresponding to a different port of said network concentrator, said security circuit for using said first address mask to determine that said first packet is an unqualified message packet if said first source address is an unqualified source address, if said security circuit detects said first message packet as being an unqualified message packet, said security circuit generating a partition signal for said first port, and said module partitioning said first port responsive to receiving said partition signal.

2. The network concentrator of claim 1 wherein said first port has a first port identifier, and said security circuit further including:

a port identifying circuit for identifying said first port as a port through which said first message packet is received;

a source address identifying circuit for identifying said first source address;

a matching circuit coupled to said port identifying circuit and said source address identifying circuit, said matching circuit for determining if said first message packet is a qualified or an unqualified message packet, and a partition signal generating circuit coupled to said matching circuit and said module, if said matching circuit determines that said first message packet is an unqualified message packet, said partition signal generating circuit generating said partition signal for said first port.

3. The network concentrator of claim 2 wherein said matching circuit further comprising:

a port mask storage circuit for storing said first address mask for said first port, said first address mask having a source address corresponding to said first port, and a mask checking circuit coupled to said port mask storage circuit and said source address identifying circuit, said mask checking circuit for retrieving said first address mask corresponding to said first port, said mask checking circuit for comparing said first address mask with said first source address, said mask checking circuit for identifying said first message packet as being a qualified message packet if said first address mask matches said first source address, and said mask checking circuit for identifying said first message packet as being an unqualified message packet if said first address mask does not match said first source address.

4. A network for securing transmission of a message packet on said network, said network comprising:

a) a first data terminal element (DTE), said first DTE for transmitting a first message packet, said first message packet including a first source address, and b) a concentrator having a module having a first port and a second port, said first port coupled to receive said first message packet, a routing circuit coupled to said said first port and said second port, said routing circuit for routing said first message packet, and a security circuit coupled to said routing circuit, said security circuit having a storing circuit for storing a set of qualified source addresses, said security circuit for identifying said first source address, said security circuit for generating a first partition signal to partition said first port if said first source address does not match a qualified source address corresponding to said first port in said set of qualified source addresses.

5. In a network concentrator, a method of preventing unauthorized communications of an unauthorized message packet, said network concentrator having a module and a security circuit, said module having a first port and a second port, said first port coupling to receive a first message packet, said first message packet having a first source address, and said security circuit coupling to said first port and said second port, said method of preventing unauthorized communications of an unauthorized message packet comprising the steps of:

a) receiving said first message packet at said first port;

b) testing said first source address, including
   accessing a port identifier associated with said first message packet and said first port,
   accessing a port mask from a plurality of port masks using said port identifier, said port mask corresponding to said first port, said plurality of port masks including a second port mask corresponding to said second port, and
   comparing said first source address with said port mask;

c) determining if said first message packet is an unauthorized message packet using said first source address;

d) if said message packet is an unauthorized message packet, generating a partition signal to partition said first port and partitioning said first port.

* * * * *